United States Patent
Kawaguchi

(10) Patent No.: US 6,169,769 B1
(45) Date of Patent: *Jan. 2, 2001

(54) METHOD AND APPARATUS FOR BIAS SUPPRESSION IN A VCO BASED FM TRANSMISSION SYSTEM

(75) Inventor: Dean M. Kawaguchi, San Jose, CA (US)

(73) Assignee: Symbol Technologies, Inc., Holtsville, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/078,257

(22) Filed: May 13, 1998

Related U.S. Application Data

(60) Continuation of application No. 08/551,089, filed on Feb. 15, 1996, now Pat. No. 5,754,587, which is a division of application No. 08/332,221, filed on Oct. 31, 1994, now Pat. No. 5,644,601.

(51) Int. Cl.[7] .............................. H04L 27/06; H03M 5/00
(52) U.S. Cl. .............................................. 375/316; 341/58
(58) Field of Search ...................................... 375/316, 322, 375/292, 319; 329/315, 318; 341/58, 71

(56) References Cited

U.S. PATENT DOCUMENTS

| | | | |
|---|---|---|---|
| 3,263,185 | 7/1966 | Lender | 332/101 |
| 4,293,822 * | 10/1981 | McFadyen | 330/254 |
| 4,617,552 * | 10/1986 | Kojima et al. | 341/58 |
| 4,620,311 | 10/1986 | Shouhamer Immink | 375/292 |
| 4,731,797 | 3/1988 | Collison et al. | 375/292 |
| 5,022,051 | 6/1991 | Crandall et al. | 375/292 |
| 5,029,183 | 7/1991 | Tymes | 375/206 |
| 5,042,037 * | 8/1991 | Endoh | 341/58 |
| 5,103,461 | 4/1992 | Tymes | 375/206 |
| 5,142,550 | 8/1992 | Tymes | 375/206 |
| 5,230,088 | 7/1993 | Kramer, Jr. et al. | 455/76 |
| 5,280,498 | 1/1994 | Tymes et al. | 375/200 |
| 5,323,125 | 6/1994 | Hiben et al. | 332/100 |
| 5,420,844 * | 5/1995 | Kawakubo et al. | 375/292 |
| 5,555,276 * | 9/1996 | Koenck et al. | 375/376 |

OTHER PUBLICATIONS

"Digital Communications Fundamentals and Application", Sklar pp. 78–82 and 106–112, Prentice Hall, 1988.
"An Improved Channel Coding Algorithm for Low Frequency Spectral Suppression", J. Orton & K. Feher, 1987.
"DC Suppresser for PCM Modems," RSA Communications, Technical Committee TR–30–1, Nov., 13–15, 1996, pp. 1–9.*

* cited by examiner

*Primary Examiner*—Tesfaldet Bocure
(74) *Attorney, Agent, or Firm*—Kirschstein, et al.

(57) ABSTRACT

A method and apparatus for bias suppression which includes a transmitter having a bias suppression encoder and a closed-loop VCO FM modulator and a receiver having a bias suppression decoder and an AC coupled FM demodulator. The bias suppression encoder generates a running sum of an encoded digital data signal as well as the sum of an (N+1)-bit block of an injected digital data signal such that the encoder may invert a block of (N+1)-bits of the injected data signal if both sums are of the same polarity thereby reducing the average DC bias of the encoded digital data signal. The encoded data signal is modulated using a closed-loop VCO FM modulator with the DC tracking effect minimized as compared to modulating the non-encoded signal directly. In the receiver having an AC coupled FM demodulator, the bias suppression decoder extracts a stuff bit set by the transmitter and inverts the received block of data if the stuff bit is true. Alternately, the received data block is not inverted if the stuff bit is false.

8 Claims, 7 Drawing Sheets

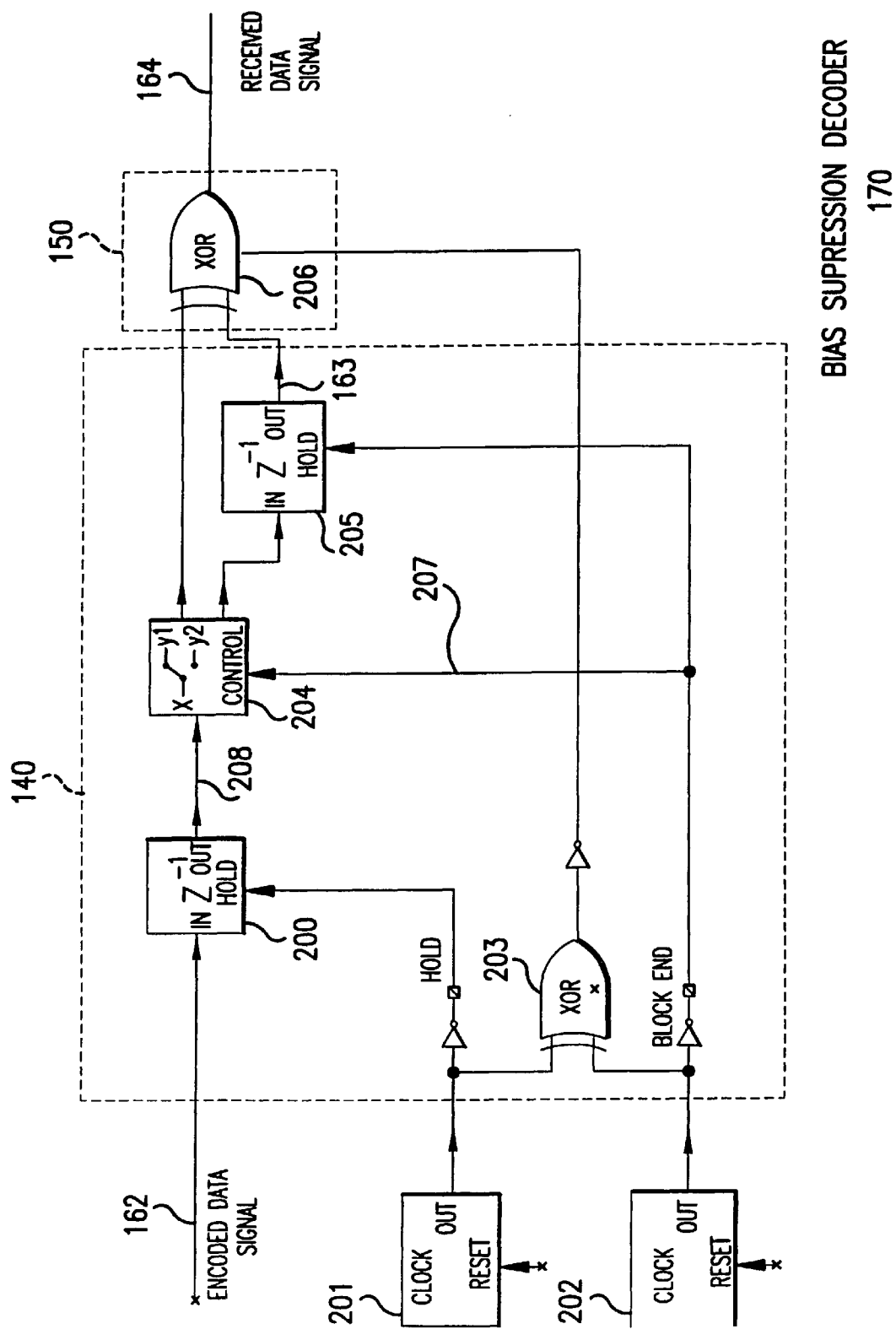

METHOD AND APPARATUS FOR BIAS SUPPRESSION IN A VCO BASED FM TRANSMISSION SYSTEM

CROSS-REFERENCE TO RELATED APPLICATIONS

This application is a continuation of U.S. patent application Ser. No. 08/551,089, filed Feb. 15, 1996, now U.S. Pat. No. 5,754,587 issued on May, 19, 1998, which in turn is a divisional application of U.S. patent application Ser. No. 08/332,221, filed Oct. 31, 1994, which issued as U.S. Pat. No. 5,644,601 on Jul. 1, 1997.

BACKGROUND OF INVENTION

This invention relates to the transmission of digital data on wireless local area networks (LANs). More particularly, this invention relates to a means of reducing the DC tracking inherent in a closed-loop VCO based FM transmission system by keeping track of the DC bias of the data signal to be transmitted and inverting selected blocks of data to reduce overall DC bias. The present invention has application in numerous communication systems which rely on the transmission of digital data over a wireless channel.

Transmitters in digital communication systems use modulators to process data signals prior to transmission of the signals over a wireless channel. The processed data signals are called modulated signals. Similarly, remote receivers in digital communication systems use demodulators to recover the data signals from the received modulated signals.

A commonly used modulation technique is frequency modulation (FM) for which a modulator comprises a voltage controlled oscillator (VCO). The VCO converts an input voltage (data signal) into an output frequency (modulated signal). When the input voltage to the VCO rises, the output frequency of the VCO increases a corresponding amount. Similarly, when the input voltage to the VCO falls, the output frequency of the VCO decreases a corresponding amount. Thus, the modulated signal has, in its time variant frequency, the information contained in the varying amplitude of the data signal. The FM modulated signal is transmitted over the wireless channel to the remote receiver.

A frequently used demodulator is an AC coupled FM demodulator. The FM demodulator converts an input frequency (received modulated signal) into an output voltage (received data signal). When the frequency of the received modulated signal increases, the output voltage of the FM demodulator rises a corresponding amount. Similarly, when the frequency of the received modulated signal decreases, the output voltage of the FM demodulator falls a corresponding amount. Thus, the received data signal has, in its amplitude, the information that is contained in the changing frequency of the received modulated signal.

The Federal Communications Commission (FCC) regulates the bands of frequencies which may be used by transmitters to transmit modulated signals over the channels of a LAN. It is important that the transmitters only transmit frequencies within the limits set by the FCC because failure to do so would cause a corruption of the modulated signals propagating over the channels of the LAN. Typically, a driver circuit is used in the transmitter to band pass filter the modulated signal such that the FCC limits are met.

It has long been the state of the art to employ a closed-loop VCO in the transmitter to ensure that the band pass filter of the driver does not attenuate data signal information. The closed-loop VCO ensures that the frequency of the modulated signal is normally in the center of the band of frequencies defined by the FCC for a particular channel. The closed-loop VCO eliminates drift in the frequency spectrum of the modulated signal due to component tolerances, ambient temperature variation and component aging.

A closed-loop VCO FM modulator employs a phase detector (PD) in a feedback loop from the output of the VCO to an error amplifier in the data signal path. The PD is provided with a reference frequency, Fref, the value of which is set to the mid-frequency value of the channel defined by the FCC. The PD outputs a phase error (Pe) voltage which is proportional to the difference between the output frequency of the VCO (modulated signal) and Fref. The error amplifier generates an error signal (Es) from Pe and the data signal and the Es is input to the VCO. The loop gain introduced by the PD and associated circuitry ensures that the output frequency of the VCO is equal to Fref when the data signal is at a null. Thus, drift in the frequency spectrum of the modulated signal is eliminated and the extremes in the frequency content of the modulated signal due to the data signal do not fall outside the FCC limits for the particular channel.

The benefit of a reduction in frequency drift realized by using a closed-loop VCO FM modulator comes at a cost. The closed-loop VCO is affected by the integrated DC offset (bias) of the data signal because the closed-loop VCO is inherently AC coupled. In an extreme case, for example when the data signal is at a "logic high" for an extended period of time (thereby having a positive average DC offset), the closed-loop VCO will respond by forcing its output frequency to Fref. Thus, the fact that the data signal is equal to a logic high is not recognized by the remote receiver.

A prior art technique commonly used for reduce DC bias tracking is to reduce the loop bandwidth of the closed-loop VCO; however, a slower loop response has the undesired effect of limiting start up speed. Eye diagrams (graphic indicators of bit error rates in the system) still show undesirable closure when bandwidth reduction is employed and thus bit error rates are, unfortunately, still high.

It has long been the state of the art to AC couple a received data signal in receivers which employ FM demodulators. AC coupling in an FM receiver ameliorates the DC bias in the received data signal due to component tolerances, ambient temperature variation and component aging. However, AC coupled FM demodulators experience all of the drawbacks of closed-loop VCO FM modulators discussed hereinabove due to DC bias tracking. Thus there is a long felt need in the art for a closed-loop VCO FM transmitter and AC coupled FM receiver system which achieves desirable frequency characteristics and low bit error rates despite the presence of DC bias in the digital data signals to be modulated.

It is an object of the present invention to produce a system for the transmission of data which utilizes a closed-loop VCO frequency modulator and which enjoys the reduced DC bias of the transmitted data signal.

It is a further object of the present invention to produce a system for the reception of data which utilizes an AC coupled frequency demodulator and enjoys the reduced DC bias of the received data signal.

SUMMARY OF THE INVENTION

The present invention ameliorates the DC bias of a digital data signal and transmits the digital data signal using a closed-loop VCO FM modulator. Thus, the frequency variation of the modulator due to DC tracking is reduced and improvement in the bit error rate is achieved.

The present invention provides a means for encoding a digital data signal prior to modulation in order to reduce the cumulative DC bias of the transmitted signal. The present invention provides a means for separating the digital data signal which is to be modulated for transmission into N-bit blocks and adding a stuff bit to each block thereby creating (N+1)-bit blocks. The present invention also provides a first accumulator for determining the cumulative DC bias of the encoded data signal and a second accumulator for determining the DC bias of the next (N+1)-bit block of the data signal. The invention additionally provides a comparator for determining whether the DC bias of the (N+1)-bit block and the cumulative DC bias of the encoded data signal are of the same or different polarity. The present invention further provides an inverter for inverting the (N+1)-bit block of the digital data signal when the polarity of the DC bias of the (N+1)-bit block of the digital data signal is the same as the polarity of the cumulative DC bias of the encoded data signal.

The invention still further provides a closed-loop VCO for modulating the encoded data signal and transmitting the modulated encoded data signal over a communications channel. Thus, the cumulative DC bias of the encoded data signal is minimized, DC tracking in the closed-loop VCO is manageable and bit error rates are reduced.

In addition, the present invention provides an AC-coupled FM demodulator and DC bias decoder to recover the original data signal at a remote location. The invention provides a means for removing the stuff bit from the received encoded data signal. The stuff bit provides an indication as to whether the N-bit portion of the received encoded data signal with which it was transmitted was inverted. The invention further provides an inverter for inverting that N-bit portion of the received data signal if the stuff bit is logically true.

DESCRIPTION OF THE FIGURES

The invention can be better understood when considered with the following drawings wherein:

FIG. 5 is a detailed block diagram of the preferred embodiment of the bias suppression decoder of the present invention.

DETAILED DESCRIPTION OF THE PREFERRED EMBODIMENT

Figure 1A:
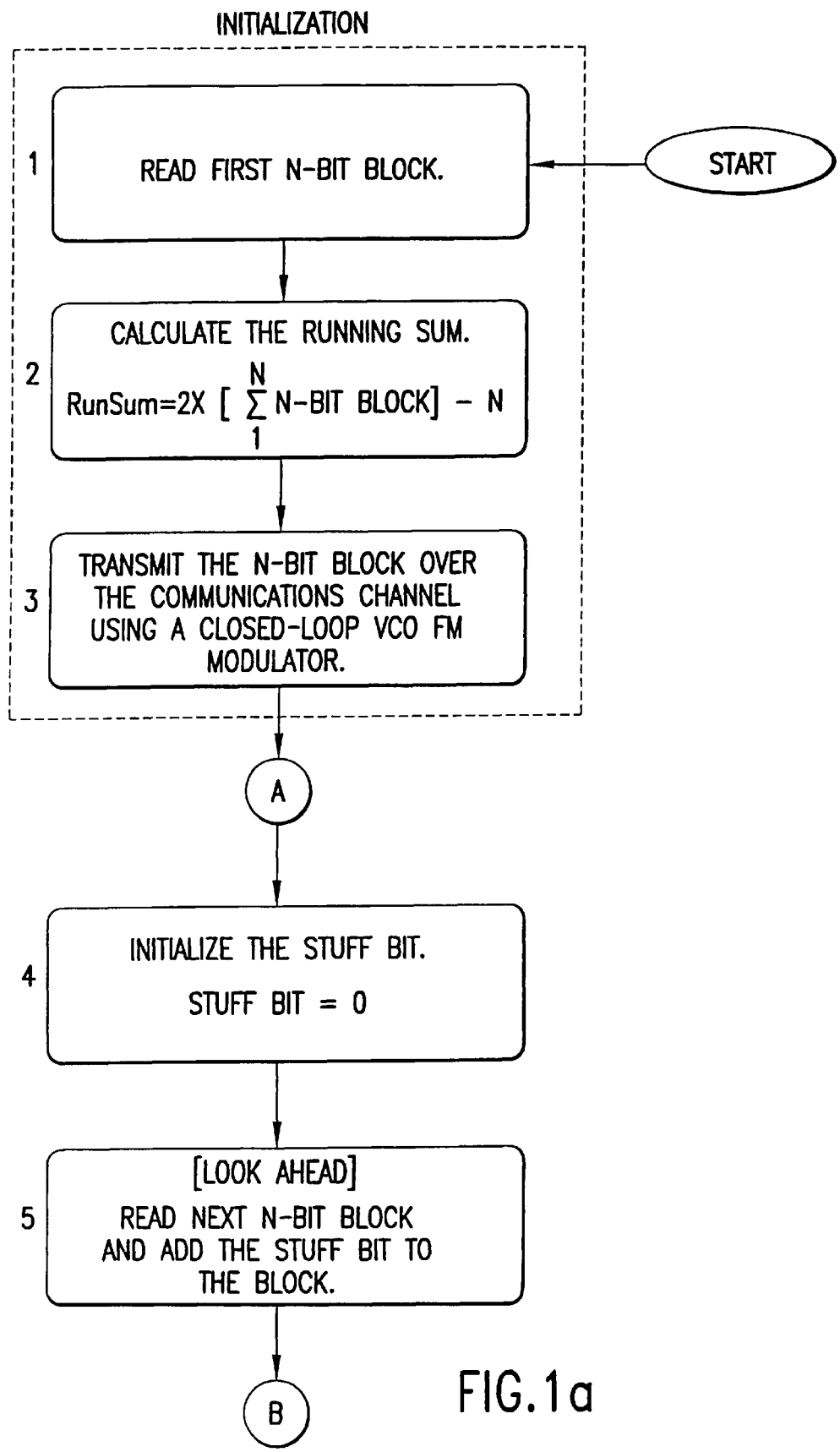
FIGS. 1a through 1c illustrate a flow diagram showing the method of reducing the DC bias of a digital data signal of the present invention.

The subject invention has application in any network which facilitates the transmission of digital data over a wireless channel in which an FM transmitter comprises a closed-loop VCO.

The present invention keeps track of the cumulative DC bias of the digital data signal that is to be modulated and transmitted and generates an encoded data signal prior to modulation. The digital data signal is divided into transmission blocks of N-bits each. A flag or "stuff bit" is inserted into each N-bit block thereby generating (N+1)-bit transmission blocks. The stuff bit is initially set "false". Any particular (N+1)-bit block (including the stuff bit) is inverted when the polarity of the DC bias of that (N+1)-bit block is the same as the polarity of the cumulative DC bias of the encoded data signal already transmitted. The DC bias of the entire encoded data signal is always driven towards zero and is thus minimized. The receiver has an indication that the block has been inverted by detecting that the stuff bit is "true". Alternately, the receiver has an indication that the block is not inverted via a "false" stuff bit.

A method of generating an encoded set of symbols having suppressed low frequency energy has been suggested in the art (J. Orton and K. Feher, "An Improved Channel Coding Algorithm for Low Frequency Spectral Suppression" 1987). The low frequency suppression code (LOFS) method disclosed therein is used to solve a problem particular to systems employing Quadrature Amplitude Modulator (QAM) transmitters and a QAM carrier recovering receivers. Specifically, LOFS is used in QAM systems to aid in recovering the carrier frequency in a QAM receiver. However, the prior art has not suggested or disclosed a method or apparatus which addresses the DC bias tracking problem in FM transmitter and receiver systems as in the present invention.

For the purposes of generally describing the transmission and bias suppression method and apparatus of the present invention it is understood that the data bits of a digital data signal may be grouped into N-bit blocks. It is further understood that the N-bit blocks of the data signal may be grouped into packets. The cumulative DC bias of the data signal prior to modulation is calculated by "summing" the bits (logic zeros and ones) of the data signal such that the "sum" of the data signal is equal to the number of 1's minus the number of 0's. This operation gives a positive polarity when the number of 1's exceeds the number of 0's and a negative polarity when the number of 0's exceeds the number 1's. It is noted that when the data signal is not encoded using a bias suppression method, then the DC bias may grow without limit.

When an encoded data signal with minimized DC bias is transmitted, it is a requirement to subsequently recover the original data signal at a remote receiver. Thus an indication is required at the receiver as to how the encoded signal may be decoded. The present invention divides the data signal into N-bit blocks and adds a stuff bit to the block thereby generating (N+1)-bit blocks. The logic level of the stuff bit provides the required indication to the receiver for decoding the block.

In generating an encoded data signal, the present invention determines the sum of the bits of each (N+1)-bit block of the data signal where the stuff bit is initially false (logic zero). The polarity of the real time DC bias of the encoded data signal is compared to the polarity of the DC bias of the (N+1)-bit block. When the polarities are the same, the (N+1)-bit block of data is inverted, otherwise the (N+1)-bit block of data is not inverted. Thus the stuff bit is true (logic one) when the encoded block is inverted and false (logic zero) when the encoded lock is not inverted.

The total encoded data signal has a minimized DC bias because the polarity of the DC bias of the total encoded signal is never the same as the DC bias of the next encoded (N+1)-bit block. Thus when the bits of the encoded (N+1)-bit block are added to the cumulative DC bias, the magnitude of the cumulative DC bias cannot grow without bound.

Figure 1B:
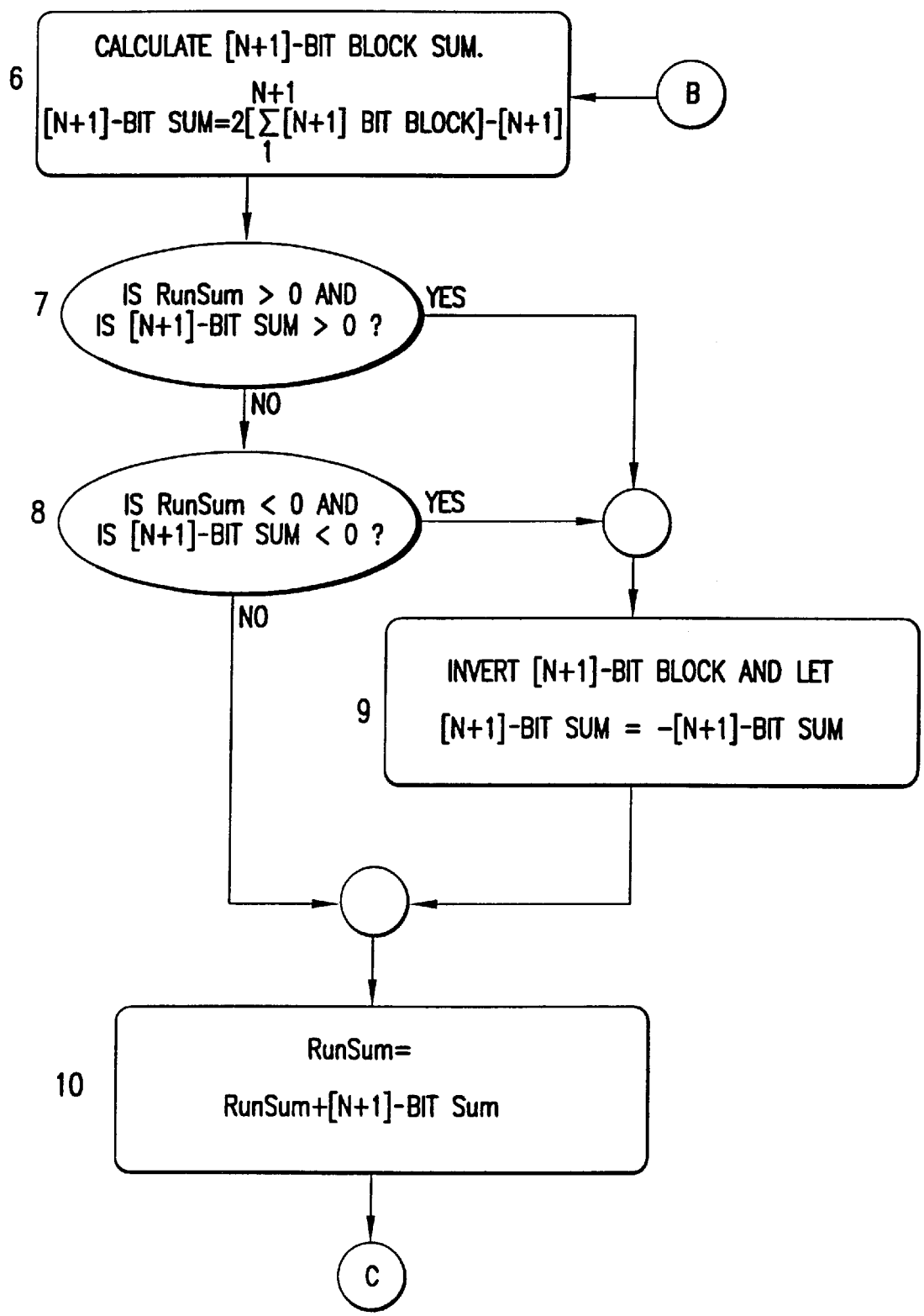
Figure 1C:
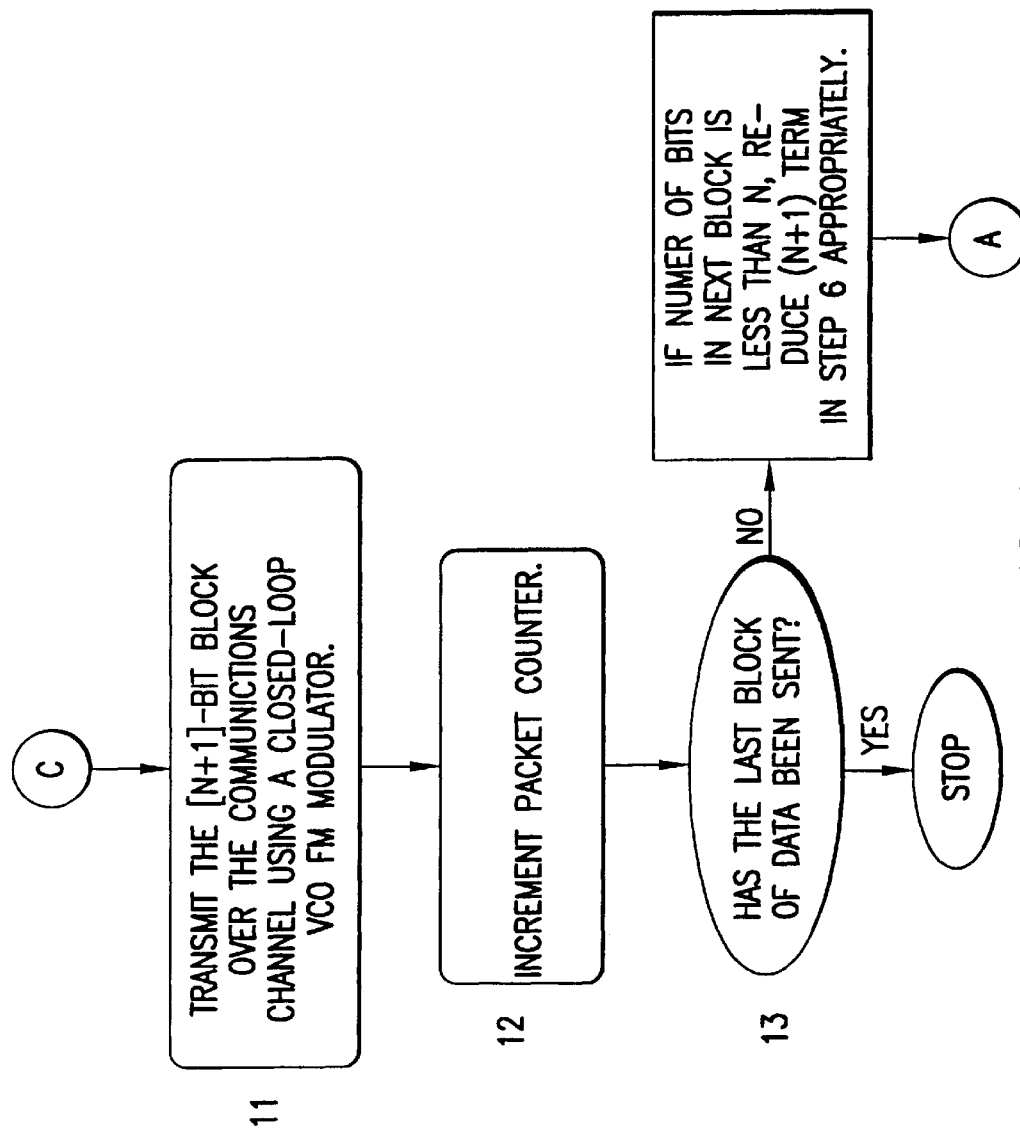

FIGS. 1a–1c illustrate the method of reducing the DC bias of a digital data signal and transmitting an encoded data signal over a communications channel using a closed loop VCO FM modulator of the present invention.

More specifically, FIG. 1a shows an initialization sequence comprising three steps. First, an N-bit block of a digital data signal packet comprised of logic zeros and ones is read in. Next, the initial sum (RunSum) of the packet is calculated using the algorithm defined in step 2. The algorithm implemented by the present invention effectively subtracts the number of logical 0's from the number of logical 1's to determine the DC bias. For example when the block comprises the following bits (1,1,1,1,1,1,1,1,1,1,0,0, 0,0,0,0) then the RunSum is 2*(10)−16=+4. It is noted that the algorithm of step 2 generates a RunSum of zero when half of the bits of the block are ones and half are zeros. Finally, the first N-bit block of the data signal is transmitted over the communications channel. It is noted that the first N-bit block of the data is not encoded because there is no prior knowledge of the polarity of the real time DC bias of the packet prior to the initialization procedure.

FIG. 1a, step 4 and 5 show the introduction of the stuff bit (initially 0, false, indicating no inversion) into the next N-bit block of data to produce an (N+1)-bit block. FIG. 1b, step 6 shows the calculation of the (N+1)-bit sum, which includes the stuff bit. The polarity of the (N+1)-bit block is thus determined by effectively subtracting the number of 0's from the numbers of 1's. Steps 7 and 8 show the logic operations used to indicate whether the polarity of the real time DC bias of the packet (RunSum) is the same as the polarity of the current (N+1)-bit Sum. When the answer to the logical question presented at step 7 or 8 is yes, then step 9 is performed.

Two operations are performed at step 9. First, the (N+1)-bit block is inverted. It is noted that the stuff bit is also inverted (from 0, false, to 1, true) indicating that the block is inverted. Second, the (N+1)-bit Sum is negated because at step 10 the RunSum must be updated to include the inverted (N+1)-bit block.

Referring to FIG. 1c, step 11 shows that the encoded (N+1)-bit block is transmitted over the communications channel using a closed-loop VCO FM modulator. The reduced DC bias of the encoded signal renders the DC tracking of the closed-loop VCO FM modulator unharmful. Steps 12 and 13 track how many blocks are left in the packet and terminates the procedure when the end of the packet is reached. It is noted that if a packet is not evenly divided into N-bit blocks of signal data then the last block will be less than N-bits. When this occurs, the term (N+1) in the equation of step 6 is reduced for the last block by an appropriate factor. Thus the present invention achieves low bit error rates, despite inherent DC bias tracking in closed-loop VCO FM modulators.

The apparatus of the preferred embodiment of the present invention is now described in detail. As seen in the block diagram of FIG. 2, a transmitter 10 employing the present invention has a bias suppression encoder (BSE) 20, closed-loop VCO FM modulator 30, driver 40 and antenna 50. The BSE 20 comprises a DC bias accumulator 22, (N+1)-bit DC bias accumulator 24, polarity detector 26, stuff bit injector 28 and inverter 29.

An input data signal 61 is input to the stuff bit injector 28. The stuff bit injector 28 adds a stuff bit (initially set to 0) to each N-bit block of the data signal 61 thereby producing an injected data signal 65 comprising blocks with (N+1) bits. The stuff bit provides an indication to a remote receiver that the next N-bits of the block are inverted if the stuff bit is true and, alternately, not inverted if the stuff bit is false.

The (N+1)-bit DC bias accumulator 24 performs a "look ahead" function and generates the sum of the next N-bit block of the data signal 61 plus the stuff bit, added by the stuff bit injector 28, by subtracting the number of 0's from the number of 1's, and outputs the sum as the (N+1)-bit DC bias signal 63. The (N+1)-bit DC bias signal 63 is either of a positive polarity, negative polarity or zero and is input into the polarity detector 26 for subsequent comparison.

The DC bias accumulator 22 generates the DC bias signal 62 which is a running (real time) sum of the logic states of the encoded data signal 66 by subtracting the number of 0's from the number of 1's. The DC bias signal 62 is either of a positive polarity, negative polarity or zero and is input to the polarity detector 26 for comparison with the (N+1)-bit DC bias signal 63.

The polarity detector 26 compares the DC bias signal 62 with the (N+1)-bit DC bias signal 63 and generates an enable signal 64 which is true when the polarity of the DC bias signal 62 is the same as the polarity of the (N+1)-bit DC bias signal 63. The enable signal 64 controls the inverter 29. The enable signal 64 causes the inverter 29 to invert the (N+1)-bit block of the injected data signal 65 if the enable signal 64 is true. Thus the bias suppression encoder "looks ahead" at the next N-bits of the data signal 61 in order to proactively minimize the DC bias of the encoded data signal 66.

The BSE 20 described hereinabove minimizes the average DC bias of the encoded data signal 66 prior to the closed-loop VCO FM modulator 30. Thus, the effect of inherent DC tracking in the modulator 30 is minimized. The modulated signal 67 is processed by the driver 40, coupled to an antenna 50 and is propagated over the LAN communication channel in a manner well known in the art.

Figure 3:
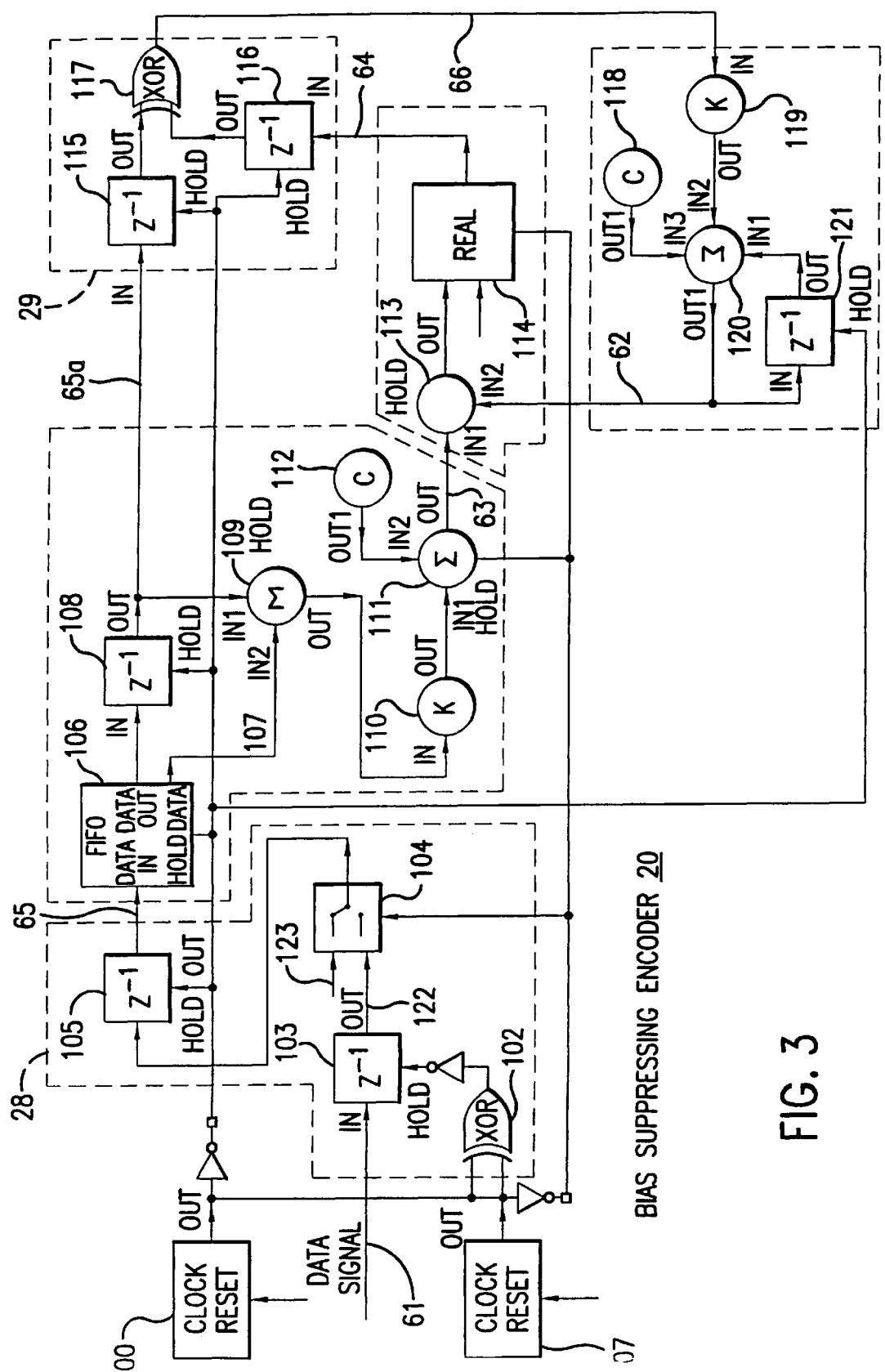
FIG. 3 shows a detailed block diagram of the preferred embodiment of the bias suppression encoder of the present invention.

A detailed block diagram of the preferred embodiment of the bias suppression encoder 20 of the present invention is shown in FIG. 3. An Application Specific Integrated Circuit (ASIC) comprising the function shown in FIG. 3 has been built and tested. The ASIC operates on 17-bit blocks (including the stuff bit) at a clock speed of 1 MHz. Operating on a random digital data signal of 100 bits, the ASIC reduced the DC bias of the original data signal by 2:1. Thus, in a closed-loop VCO FM modulator having a total frequency deviation bandwidth of 160 KHz, the DC tracking of the VCO caused only a 40 KHz offset with the encoded data signal as opposed to an 80 KHz offset with the original data signal. It is noted that in an alternate embodiment of the present invention, an (N+1)-bit block of the data signal 65 comprises 33 bits.

Figure 2:
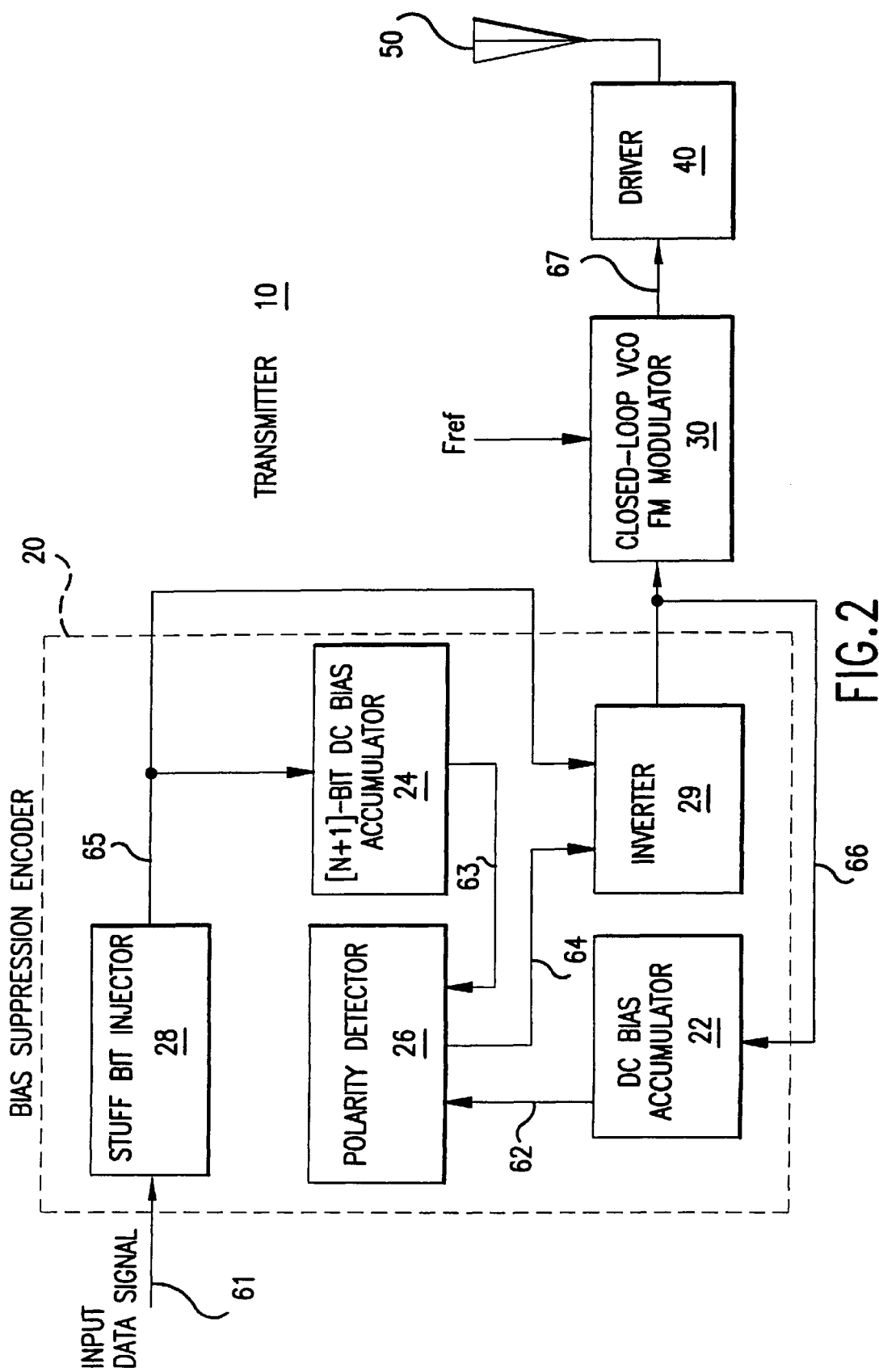
FIG. 2 is a block diagram of a transmitter employing the bias suppression encoder and closed-loop FM modulator of the present invention.

Referring to FIG. 3, dashed lines are drawn around the functional blocks of FIG. 2. The BSE 20 shown in FIG. 3 comprises the stuff bit injector 28, the (N+1)-bit accumulator 24, the DC bias accumulator 22, the polarity detector 26 and the inverter 29. Clock 100 and clock 101 generate clock signals which are coupled throughout the circuit and are used to maintain proper timing relationships between signals. Clock 100 operates at a frequency of 1 MHz. Clock 101 operates at a frequency of 58.8 KHz which is 1/17 of clock 100.

The stuff bit injector 28 comprises a flip/flop (FF) 103, a FF 105, a switch 104 and an XOR gate 102. First, the switch 104 connects the line 123 (having level 0) to the FF 105. Thus a stuff bit at a level of 0 is clocked into the FF 105. Next, the switch 104 connects line 122 to the FF 105. The 16 bits of the data signal are then clocked through the FF 103, the switch 104 and the FF 105. Thus an injected data signal 65 having a 17-bit block (stuff bit plus 16 data bits) is generated. Every 17th clock pulse, another stuff bit is injected into the data signal 61.

The (N+1)-bit accumulator 24 comprises a First-In-First-Out register (FIFO) 106, a FF 108, a summer 109, an amplifier 110, a reference 112 and a summer 111. As the 17-bit block is clocked through the FF 105, the 16 data bits are accumulated in the (FIFO) 106 and the stuff bit is resident in the FF 108. The FIFO 106 generates a signal 107 called 16 BitSum which is the sum of the resident 16 data bits. The remaining elements of the (N+1)-bit accumulator generate the (N+1)-bit DC bias signal 63 which is expressed by the following algorithm:

(N+1)-bit DC bias=K*(16 BitSum+stuff bit)+C where K=2 and C=17. Every 17th clock pulse, a new (N+1)-bit DC bias signal 63 is generated.

The DC bias accumulator 22 comprises amplifier 119, reference 118, summer 120 and FF 121. The elements of the DC bias accumulator 22 are coupled such that DC bias signal 62 is generated according to the following algorithm:

$$\text{New DC bias signal } 62 = K * \begin{bmatrix} (N+1) \text{-bit sum} \\ \text{of} \\ \text{encoded signal } 66 \end{bmatrix} + \begin{bmatrix} \text{Old} \\ \text{DC bias} \\ \text{signal } 62 \end{bmatrix} + C$$

where K=2 and C=17. Every 17th clock pulse, a new DC bias signal 62 is generated.

Polarity detector 26 comprises multiplier 113 and threshold element 114. Threshold element 114 produces a 1 (one) when the product of DC bias signal 62 and (N+1)-bit DC bias signal 63 is positive and a 0 (zero) if the product is negative. Thus enable signal 64 is true when the DC bias signal 62 and the (N+1)-bit DC bias signal 63 are of the same polarity. Every 17th clock pulse, a new enable signal 64 is generated.

Inverter 29 comprises a FF 116, a FF 115 and an XOR gate 117. When enable signal 64 is true, the injected data signal 65a is inverted by XOR gate 117. Conversely, when enable signal 64 is false, the injected data signal 65a is passed through and not inverted by XOR gate 117. When the data signal 61 component of the injected data signal 65 is inverted, so too is the stuff bit inverted from the initial setting of 0 to a 1. When the injected data signal 65 is not inverted, the stuff bit remains at 0. Thus the inverter 29 generates the encoded data signal 66 having a minimized DC bias and a stuff bit indicative of whether the bits in the block are inverted.

In an alternate embodiment, the function of the BSE 20 comprising the DC bias accumulator 22, (N+1)-bit DC bias accumulator 24, polarity detector 26, stuff bit injector 28 and inverter 29 is performed by a microprocessor operating under the control of a software program. The microprocessor performs the step of adding the stuff bit to the beginning of the next N-bit block of the data signal 61, thus creating an injected data signal 65 comprised of (N+1)-bit blocks. Also the steps of calculating a running sum of the encoded data signal 66 and calculating a sum of the next (N+1)-bits of the injected data signal 65 are performed by the microprocessor. Further, the microprocessor performs the steps of setting the value of an enable signal 64 (or flag) to be true if the running sum of the encoded data signal 66 is of the same polarity as the sum of the next (N+1)-bits of the injected data signal 65. Finally, the microprocessor inverts the next N-bit block of the injected data signal 65 if the enable signal 64 is true.

An I/O port of the microprocessor outputs the encoded data signal 66 to the closed-loop VCO FM modulator 30 and the driver 40 and antenna 50 operate as described hereinabove. The preferred embodiment implements the ASIC based hardware design heretofore described since it operates faster than a typical commercially available microprocessor.

Figure 4:
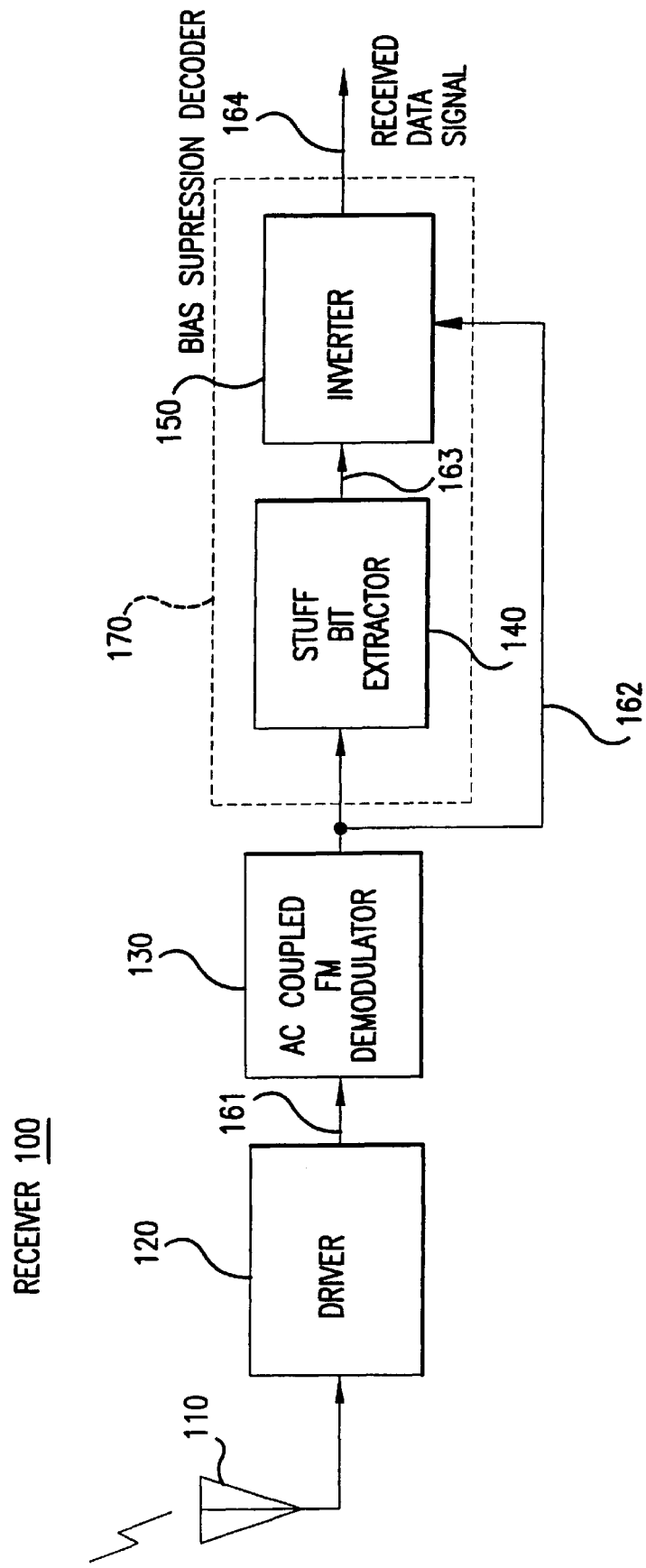
FIG. 4 is a block diagram of a receiver employing the bias suppression decoder and AC coupled FM demodulator of the present invention.

Reference is now made to FIG. 4. FIG. 4 shows a remote receiver 100 comprising a bias suppression decoder (BSD) 170 and AC coupled FM demodulator 130 of the present invention as well as an antenna 110 and driver 120. The BSD 170 comprises a stuff bit extractor 140 and an inverter 150.

For the purposes of this discussion, it is understood that any well known technique of synchronizing the transmitter and receiver 100 has been employed. Thus, the antenna 110 receives a modulated signal which has been propagated over the channel from the transmitter 10. The driver 120 provides a filtering and amplifying process well known in the art and generates a received modulated signal 161. The received modulated signal 161 is input to the AC coupled FM demodulator 130 which generates a received encoded data signal 162 proportional to the frequency content of the received modulated signal 161. The stuff bit extractor 140 extracts the stuff bit from the digital signal 162 and generates an enable signal 163 which is true if the stuff bit is true. Conversely, the enable signal 163 is false if the stuff bit is false.

The inverter 150 takes the received encoded data signal 162 and the enable signal 163 as inputs. The inverter 150 inverts the next N-bit block of the data signal 162 if the enable signal 163 is true and, conversely, does not invert the data signal 162 if the enable signal 163 is false. The inverter 150 thus decodes the received encoded data signal 162 and generates a received (decoded) data signal 164 which is a true copy of the data signal 61 from the transmitter 10.

FIG. 5 shows a detailed block diagram of the preferred embodiment of the bias suppression decoder 170 of the present invention. As indicated by the dashed lines, the bias suppression decoder 170 comprises stuff bit extractor 140 and inverter 150 as well as clock 201 and clock 202. Clock 201 and clock 202 generate clock signals which are coupled throughout the circuit and are used to maintain proper timing relationships between signals. Clock 201 operates at a frequency of 1 MHz. Clock 202 operates at a frequency of 58.8 KHz, which is 1/17 of clock 201.

Stuff bit extractor 140 comprises FF 200, XOR gate 203 switch 204 and FF 205. FF 200 clocks in the stuff bit and data bits of each 17 bit block of the encoded data signal 162. The arrival of the stuff bit is coincident with pulse signal 207 and thus switch 204 connects signal 208 to FF 205 once every 17 clock cycles. Thus, each stuff bit is captured in FF 205, the output of which is an enable signal 163. Enable signal 163 is used during the sequencing of the data bits of the (N+1)-bit block. When enable signal 163 is true, XOR gate 206 of the inverter 150 inverts the data bits of the block and produces the received data signal 164.

In an alternate embodiment of the receiver 100, the functions of the stuff bit extractor 140 and the inverter 150 are performed by a microprocessor which is under the control of a software program. Thus, the microprocessor performs the steps of extracting the stuff bit from the received encoded data signal 162, generating an enable signal 163 and inverting the next N-bit block of the received encoded data signal 162 if the enable signal 163 is true. In this alternate embodiment of the receiver 100, the antenna 110, driver 120 and AC coupled FM modulator 130 operate as described hereinabove. The microprocessor receives the encoded data signal 162 through an I/O port.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

I claim:

1. A receiver for receiving radio frequency signals over a wireless network, comprising:

a) an FM demodulator coupled to a receiving antenna, for generating a received encoded data signal with minimized DC bias from a frequency modulated signal transmitted over the network, the received encoded data signal being grouped into blocks, each block having data bits and a single stuff bit having logic levels indicative of whether or not the data bits of a respective block were inverted to reduce the DC bias;

b) a stuffbit extractor coupled to the demodulator, for removing the stuff bit from the respective block, and for generating an enable signal having logic levels corresponding to the logic levels of the removed stuff bit; and c) an inverter coupled to the demodulator and to the extractor, for inverting the data bits of the respective block when one of the logic levels of the enable signal corresponds to the logic level of the stuff bit which signifies that data bit inversion had occurred, and for producing a received decoded signal.

2. The receiver of claim 1, wherein the extractor includes a flip-flop for capturing each stuff bit; and wherein the inverter includes an XOR gate.

3. The receiver of claim 1, wherein the extractor and the inverter are constituted by a programmed microprocessor.

4. The receiver of claim 1, wherein one of the logic levels of the stuff bit is set as a default level and indicates that inversion of the data bits of the respective block had not occurred.

5. A method of receiving radio frequency signals over a wireless network, comprising the steps of:

a) generating a received encoded data signal with minimized DC bias from a frequency modulated signal transmitted over the network, the received encoded data signal being grouped into blocks, each block having data bits and a single stuff bit having logic levels indicative of whether or not the data bits of a respective block were inverted to reduce the DC bias;

b) removing the stuffbit from the respective block, and generating an enable signal having logic levels corresponding to the logic levels of the removed stuff bit; and c) inverting the data bits of the respective block when one of the logic levels of the enable signal corresponds to the logic level of the stuff bit which signifies that data bit inversion had occurred, and producing a received decoded signal.

6. The method of claim 5, wherein the removing step is performed by capturing each stuff bit; and wherein the inverting step is performed by using an XOR gate.

7. The receiver of claim 5, wherein the removing and inverting steps are performed by a programmed microprocessor.

8. The receiver of claim 5; and further comprising the step of setting one of the logic levels of the stuff bit as a default level to indicate that inversion of the data bits of the respective block had not occurred.

* * * * *